United States Patent
Albert et al.

(10) Patent No.: US 10,500,710 B2
(45) Date of Patent: Dec. 10, 2019

(54) GUIDING DEVICE DESIGNED TO BE POSITIONED ON A SURFACE WITH A DOUBLE RADIUS OF CURVATURE

(71) Applicant: Airbus Operations S.A.S., Toulouse (FR)

(72) Inventors: Fabien Albert, La Baule (FR); Perig Le-Henaff, Pontchateau (FR)

(73) Assignee: Airbus Operations S.A.S. (FR)

( * ) Notice: Subject to any disclaimer, the term of this patent is extended or adjusted under 35 U.S.C. 154(b) by 188 days.

(21) Appl. No.: 15/834,414

(22) Filed: Dec. 7, 2017

(65) Prior Publication Data

US 2018/0178370 A1 Jun. 28, 2018

(30) Foreign Application Priority Data

Dec. 22, 2016 (FR) ...................................... 16 63119

(51) Int. Cl.
*B25H 1/00* (2006.01)
*B23Q 9/00* (2006.01)
*B23Q 9/02* (2006.01)

(52) U.S. Cl.
CPC ......... *B25H 1/0042* (2013.01); *B23Q 9/0042* (2013.01); *B23Q 9/02* (2013.01); *B23Q 2210/008* (2013.01)

(58) Field of Classification Search
CPC ............ B23Q 9/0042; B23Q 2210/008; B23Q 9/0007; B25H 1/0057; B25H 5/00; B25H 1/0042; B25H 1/0064
USPC .......................................................... 33/626
See application file for complete search history.

(56) References Cited

U.S. PATENT DOCUMENTS

| | | | |
|---|---|---|---|
| 6,158,666 A * | 12/2000 | Banks | B21J 15/10 105/25 |
| 7,526,851 B1 * | 5/2009 | Boyl-Davis | B25B 11/007 29/559 |
| 9,527,606 B2 * | 12/2016 | Marin | B64F 5/10 |
| 9,656,319 B2 * | 5/2017 | Sarh | B21J 15/142 |
| 9,789,948 B2 * | 10/2017 | Marin | B64C 1/061 |
| 2015/0034763 A1 * | 2/2015 | Marin | B64C 1/061 244/119 |
| 2015/0040369 A1 * | 2/2015 | Marin | B64F 5/10 29/428 |
| 2015/0128394 A1 * | 5/2015 | Sarh | B21J 15/142 29/243.53 |

(Continued)

FOREIGN PATENT DOCUMENTS

| | | |
|---|---|---|
| CN | 106 514 082 A | 3/2017 |
| EP | 2 082 839 A2 | 7/2009 |

(Continued)

OTHER PUBLICATIONS

FR 16 63119 Search Report dated Sep. 6, 2017.

*Primary Examiner* — Yaritza Guadalupe-McCall
(74) *Attorney, Agent, or Firm* — Lerner, David, Littenberg, Krumholz & Mentlik, LLP

(57) ABSTRACT

A guiding device includes a rail which extends in a direction, a plurality of runners distributed in the direction, and, for each runner, at least one runner/rail connection connecting each runner and the rail, configured to allow each runner to pivot independently from the other runners relative to the rail, around an axis of pivoting parallel to the direction.

6 Claims, 2 Drawing Sheets

(56) References Cited

U.S. PATENT DOCUMENTS

2016/0311034 A1* 10/2016 Eakins .................... B23B 41/16
2018/0178370 A1* 6/2018 Albert ...................... B23Q 9/02

FOREIGN PATENT DOCUMENTS

EP         2 384 842 A1   11/2011
WO     2007/019228 A1    2/2007

* cited by examiner

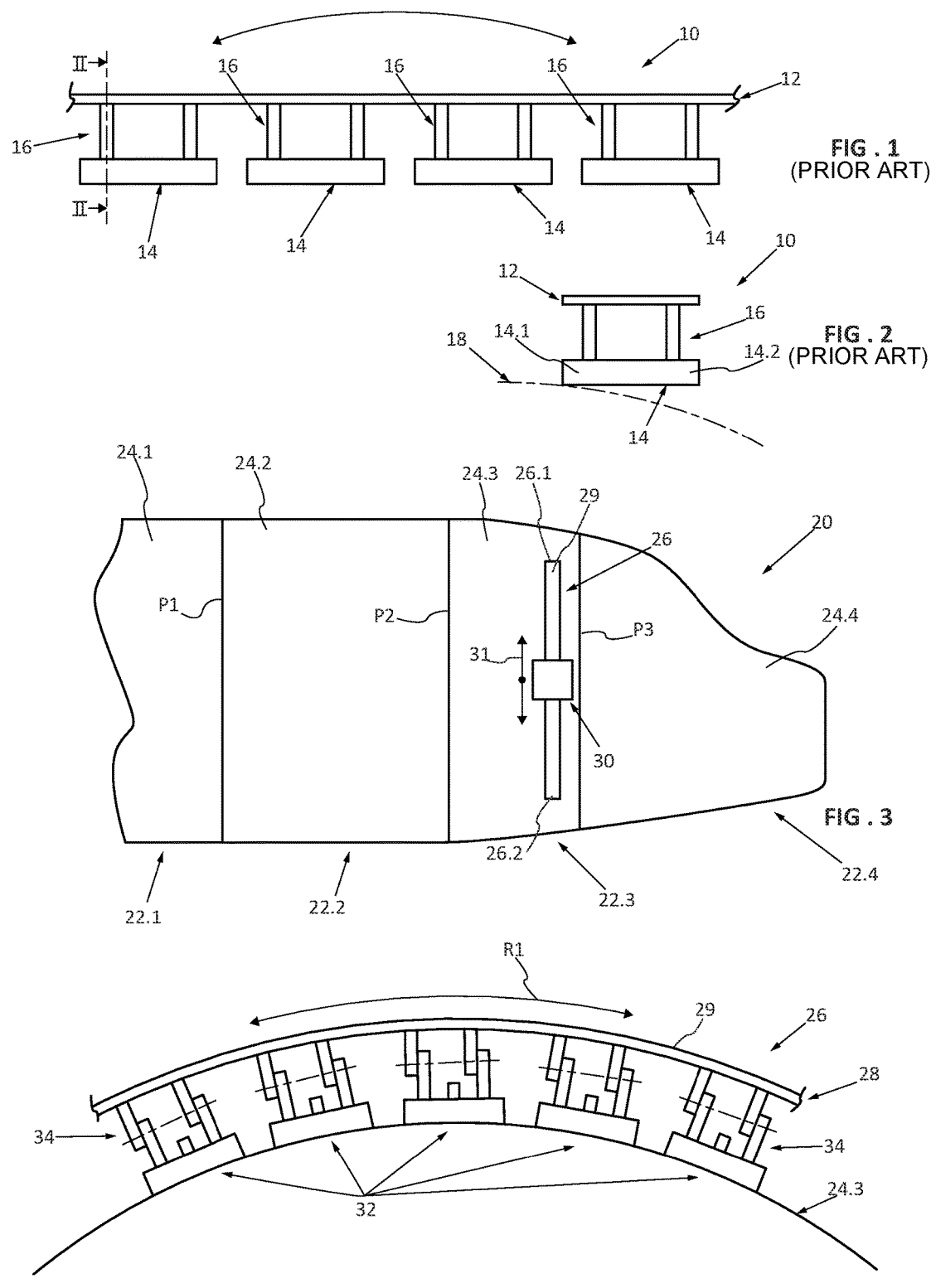

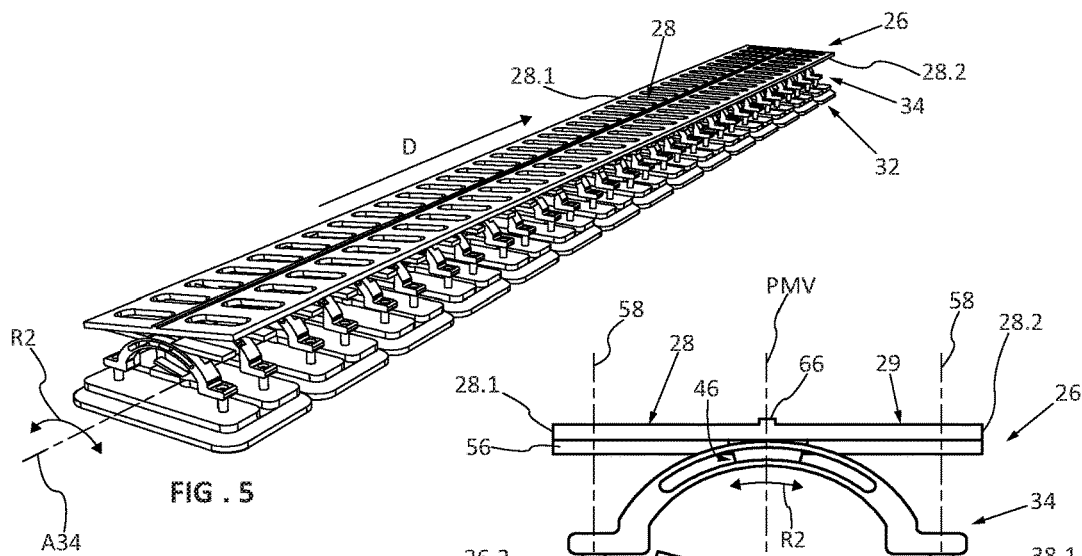
FIG. 5
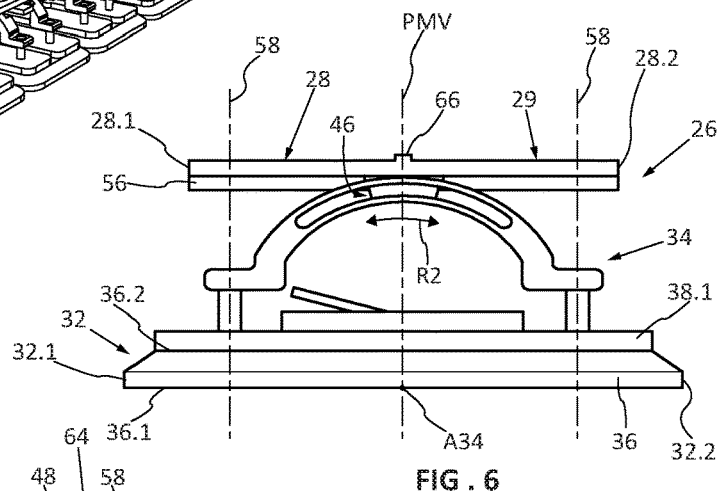
FIG. 6
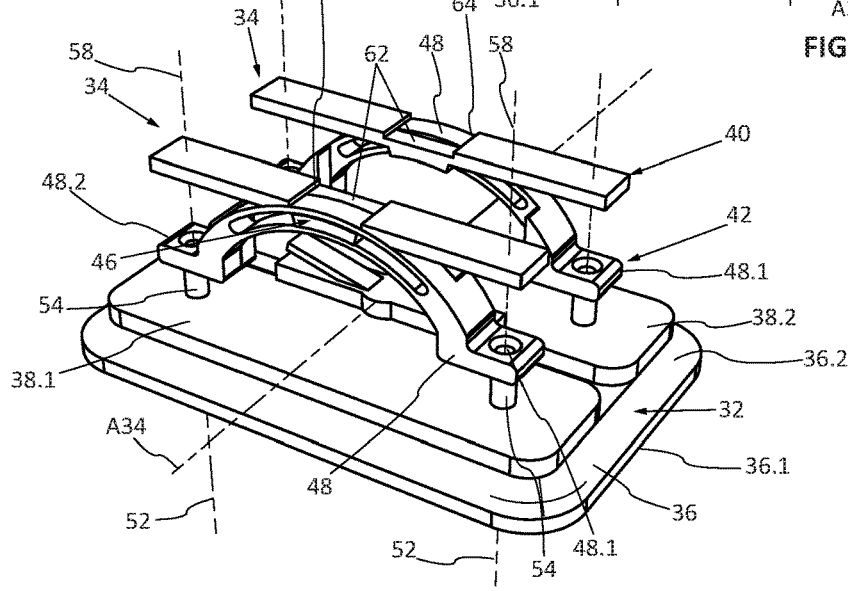
FIG. 7
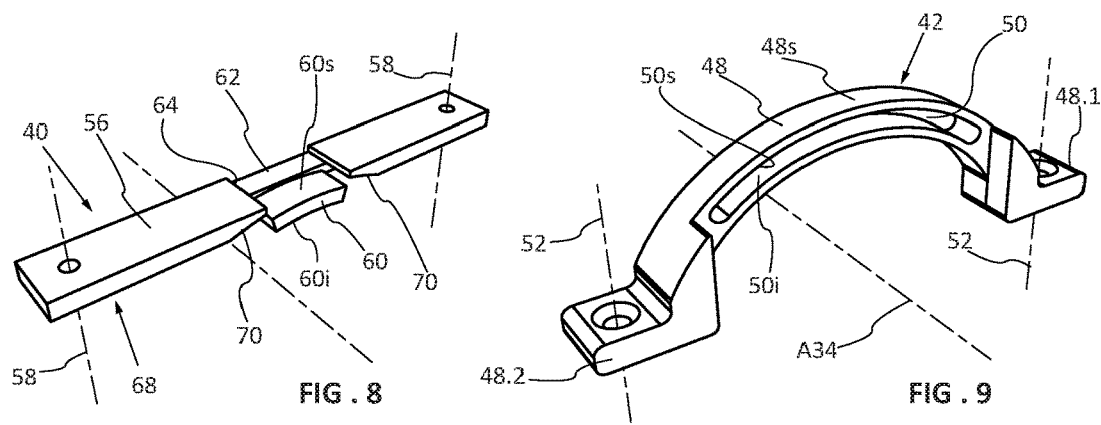
FIG. 8
FIG. 9

GUIDING DEVICE DESIGNED TO BE POSITIONED ON A SURFACE WITH A DOUBLE RADIUS OF CURVATURE

FIELD OF THE INVENTION

The present application relates to a guiding device designed to be positioned on a surface with a double radius of curvature.

BACKGROUND OF THE INVENTION

In order to carry out certain operations of drilling and riveting on an aircraft fuselage, a guiding device is positioned temporarily on the outer surface of the fuselage in order to guide a tool in a direction of work.

According to an embodiment of the prior art shown in FIGS. 1 and 2, a guiding device 10 comprises:
- a rail 12 which is configured to support a tool, and is deformed in order to extend in a first direction parallel to the direction of work of the tool;
- a plurality of suckers 14 which are regularly distributed in the first direction, and are each configured to be secured temporarily on a surface;
- for each sucker 14, a rigid sucker/rail connection 16 between the sucker 14 and the rail 12.

Conventionally, an aircraft fuselage comprises a plurality of sections which are placed end-to-end at transverse planes, and each have an outer surface. When the operation carried out takes place in a direction of work parallel to a transverse plane of the aircraft, the guiding device 10 then follows the profile of a surface which has a radius of curvature in the first direction.

However, certain sections of fuselage have surfaces which are said to be non-developable. Some of these non-developable surfaces have a double radius of curvature, and in particular have a first radius in a direction parallel to a transverse plane of the aircraft, and a second radius of curvature in a second direction perpendicular to a transverse plane of the aircraft.

When the guiding device 10 is positioned on a section of fuselage with a non-developable surface, it matches the forms of the surface, and naturally tends to be distanced relative to the direction of work which the tool must follow. Thus, a first end of the guiding device 10 is arranged in the vicinity of the direction of work, whereas the second end of the guiding device 10 is distanced from the direction of work. For certain sections of fuselage, the distance between the second end of the guiding device 10 and the direction of work which the tool must follow is too great to be compensated for by the dimensions of the tool. In addition, because of this distance, the rail 12 can have torsion which blocks the displacement of the tool along the rail, and the guiding device 10 can interfere with other elements positioned around the fuselage.

In a case of this type of a section of fuselage which has a non-developable surface, the guiding device 10 cannot be positioned parallel to a transverse plane, since, in this position, not all of the surface of the suckers is in contact with the surface of the fuselage 18.

As illustrated in FIG. 2, only an end 14.1 of each sucker is in contact with the surface of the fuselage 18, the other end 14.2 being distanced.

BRIEF SUMMARY OF THE INVENTION

An aspect of the present invention may remedy the disadvantages of the prior art.

For this purpose, the invention relates to a guiding device comprising:
- a rail which extends in a direction, and comprises a support surface which is configured to support and guide a tool in a direction of work parallel to the direction;
- a plurality of runners distributed in the direction, each runner being configured to occupy an active state in which the runner is immobilized, and a state of rest in which the runner can move;
- for each runner, at least one runner/rail connection connecting each runner and the rail, characterized in that each runner/rail connection is configured to allow each runner to pivot independently from the other runners relative to the rail, around an axis of pivoting parallel to the direction.

Thus, according to an embodiment of the invention, the rail can be positioned parallel to the direction of work on an outer surface of a non-developable fuselage, each runner being placed with its entire surface on the outer surface of the fuselage.

According to another characteristic, the axis of pivoting is positioned on a first face of the runner configured to be placed on a work surface on which the guiding device is added in operation, equidistantly from the lateral edges of the runner.

According to a variant, each runner/rail connection comprises a first part which is integral with the rail, and a second part which is integral with the runner, the first and second parts having forms which cooperate, configured to form a slide connection in the form of an arc of a circle with a centre positioned on the axis of pivoting.

Thus, the centre of rotation of each runner coincides with the centre of the first face of the runner, and each runner remains immobile when the runner is placed on the work surface.

According to another characteristic, the second part comprises a body connected to the runner which has an oblong hole comprising an upper rim and a lower rim which are coaxial, and the first part comprises a cross-member which is connected to the rail, and a head which is integral with the cross-member, the said head comprising an upper face which is configured to be placed and slid on the upper rim of the oblong hole, and a lower face which is configured to be placed and slid on the lower rim of the oblong hole.

According to one embodiment:
- the head is connected to the cross-member by a support, and is offset towards the axis of pivoting relative to the cross-member;
- on a first face which is oriented towards the head, the cross-member comprises at least one cylindrical cut-out coaxial with the upper surface of the head;
- the body comprises an upper face oriented towards the cross-member coaxial with the rim of the oblong hole, and the distance between the upper face and the upper rim of the oblong hole is equal to the distance between the upper face of the head and the cut-out in the cross-member.

According to another characteristic, each runner is connected to the rail by two runner/rail connections offset in the direction, the supports which connect the heads to the cross-members being positioned between the bodies of the two runner/rail connections.

BRIEF DESCRIPTION OF THE DRAWINGS

Other characteristics and advantages will become apparent from the following description of the invention, provided purely by way of example, with reference to the appended drawings in which:

FIG. 1 is a lateral view of a guiding device which illustrates an embodiment of the invention;

FIG. 2 is a cross section along the line II-II of the guiding device shown in FIG. 1;

FIG. 3 is a schematic representation of a guiding device positioned on a work surface which illustrates an embodiment of the invention;

FIG. 4 is a schematic cross section of the guiding device shown in FIG. 3;

FIG. 5 is a view in perspective of a guiding device which illustrates a variant of the invention;

FIG. 6 is a front view of the guiding device shown in FIG. 5;

FIG. 7 is a view in perspective of a runner and a runner/rail connection of the guiding device shown in FIG. 5;

FIG. 8 is a view in perspective of a first part of the runner/rail connection shown in FIG. 7; and FIG. 9 is a view in perspective of a second part of the runner/rail connection shown in FIG. 7.

DETAILED DESCRIPTION

FIG. 3 illustrates a fuselage 20 of an aircraft which comprises a plurality of sections 22.1 to 22.4 placed end-to-end at transverse planes P1, P2, P3, and each having an outer surface 24.1 to 24.4. For certain sections 22.1 and 22.2, the outer surface 24.1, 24.4 is substantially cylindrical and comprises a radius of curvature. For other sections 22.3 and 22.4, the outer surface 24.3 and 24.4 is non-developable, and has a plurality of radii of curvature, in particular two radii of curvature in the case of the section 22.3.

A guiding device 26 is positioned on the outer surface 24.3, known as the work surface, in the vicinity of the transverse plane P3, parallel to the transverse plane P3.

This guiding device 26 extends in a direction D between a first end 26.1 and a second end 26.2, and comprises:
- a rail 28 which extends from the first end 26.1 as far as the second end 26.2, and comprises a support surface 29 configured to support and guide a tool 30 in a direction of work 31 parallel to the direction D;
- a plurality of runners 32 distributed in the direction D, each runner 32 being configured to occupy an active state in which it is immobilized relative to the work surface 24.3, and a state of rest in which it can move relative to the work surface 24.3;
- for each runner 32, at least one runner/rail connection 34 configured to connect each runner 32 to the rail 28.

The rail 28 is configured to occupy a formed state in which the support surface 29 of the rail 28 is parallel to the work surface 24.3. Thus, the rail 28 can be deformed according to a first radius of curvature R1 shown in FIG. 4 and according to a second radius of curvature R2, in a plane perpendicular to the direction D shown in FIG. 5. The rail is not described further, because it can be identical to the rails of the prior art.

The rail 28 comprises a vertical median plane PMV which is parallel to the direction D, equidistant from the edges 28.1 and 28.2 of the rail 28, and perpendicular to the support surface 29 of the rail 28.

The runner 32 comprises lateral edges 32.1 and 32.2 parallel to the direction D and also positioned equidistantly from the vertical median plane PMV.

According to an embodiment shown in FIGS. 6 and 7, each runner 32 comprises a bearing plate 36 which is configured to be deformed according to the first and second radii of curvature R1 and R2, and comprises a first face 36.1 configured to be placed on the work surface 24.3, and a second face 36.2, opposite the first face 36.1, and oriented towards the rail 28, as well as two rigid blocks 38.1 and 38.2 which are positioned on the second face 36.2, and are integral with the bearing plate 36. The two rigid blocks 38.1 and 38.2 are offset in the direction D, in order to allow the bearing plate 36 to be deformed according to the first radius of curvature R1.

According to one mode of operation, each runner 32 is of the type with suckers.

The invention is not limited to this embodiment for the runners 32. Thus, the runners can be of electromagnetic type, with the immobilization of the runner relative to the work surface 24.3 not being generated by low pressure but by magnetization. Other technical solutions can be envisaged in order to immobilize the runners 32 temporarily relative to the work surface 24.3.

Advantageously, the guiding device comprises at least one control unit in order to control the state of the runners 32.

According to a characteristic of the invention, each runner/rail connection 34 is configured to allow each runner 32 to pivot independently from the other runners 32 relative to the rail 28, around an axis of pivoting A34 which is parallel to the direction D and positioned in the vertical median plane PMV.

According to this arrangement, the rail 28 can be positioned parallel to a transverse plane on a work surface with a double radius of curvature, each runner 32 being placed on the entire first face 36.1 against the work surface 24.3. Thus, the direction D of the rail 28 is parallel to the direction of work 31 which the tool 30 must follow.

Each runner/rail connection 34 comprises a first part 40 which is integral with the rail 28, and a second part 42 which is integral with the runner 32.

According to a first variant, the first part 40 is connected to the second part 42 by a rotational shaft 44 which forms the axis of pivoting A34.

According to a second variant shown in FIGS. 5 to 9, the first and second parts 40, 42 have forms which cooperate, configured to form a slide connection 46 in the form of an arc of a circle with a centre positioned on the axis of pivoting A34.

According to a characteristic of the invention, the axis of pivoting A34 is positioned on the first face 36.1, equidistantly from the lateral edges 32.1 and 32.2 of the runner 32. In operation, the axis of pivoting A34 is positioned at an interface between the runner 32 and the work surface 24.3. This positioning, combined with the fact that the axis of pivoting A34 is equidistant from the lateral edges 32.1 and 32.2 of each runner 32, makes it possible to form the runners 32 on the work surface 24.3, without generating displacement of the centre of each runner 32.

According to an embodiment of this second variant, the second part 42 comprises a body 48 in the form of an arc of a circle, which has an oblong hole 50 in the form of an arc of a circle, with a centre of curvature positioned on the axis of pivoting A34. The oblong hole 50 has an upper rim 50S and a lower rim 50I which are coaxial and have the same axis, coincident with the axis of pivoting A34.

The radius in the form of an arc of a circle of the oblong hole 50 is determined such that the axis of pivoting A34 is positioned on the first face 36.1, equidistantly from the lateral edges 32.1 and 32.2 of the runner 32.

The body 48 comprises two ends 48.1 and 48.2 which are connected to the runner 32 by any appropriate securing means 52, such as screws or bolts for example, and are kept distanced from the runner by means of two braces 54, one at each end 48.1, 48.2.

As a complement, the first part 40 comprises a cross-member 56 which is connected to the rail 28 by any appropriate securing means 58, such as screws or bolts for example, and a head 60 which is integral with the cross-member 56, the said head 60 comprising forms which are designed to slide in the oblong hole 50 of the second part 42.

Thus, the head 60 comprises an upper face 60S which is configured to be placed and slid on the upper rim 50S of the oblong hole 50, as well as a lower face 60I which is configured to be placed and slid on the lower rim 50I of the oblong hole 50. The head 60 has a length shorter than that of the oblong hole 50, in order to allow it to slide in the oblong hole 50.

According to one embodiment, the head 60 is offset relative to the cross-member 56 towards the axis of pivoting A34, in a radial direction (perpendicular to the axis of pivoting A34). In this case, the head 60 is connected to the cross-member 56 by a support 62. Advantageously, the cross-member 56, the head 60 and the support 62 are in a single piece.

According to one embodiment, the cross-member 56 comprises a set-back 64 at the support 62, in order to accommodate a guiding system 66, such as rack for example, provided at the rail 28.

On a first face 68 which is oriented towards the head 60, the cross-member 56 comprises at least one cylindrical cut-out 70 coaxial with the upper face 60S of the head 60. As a complement, the body 48 comprises an upper face 48S which is oriented towards the cross-member 56 coaxial with the rim 50S of the oblong hole 50. The distance between the upper face 48S and the upper rim 50S of the oblong hole 50 is equal to the distance between the upper face 60S of the head 60 and the cut-out 70 in the cross-member 56. Thus, in operation, three surfaces 60I, 60S, 70 of the first part 40 slide respectively on three surfaces 50I, 50S, 48S of the second part 42, which provides optimum guiding between the first part 40 and the second part 42.

According to one embodiment, each runner 32 is connected to the rail 28 by two runner/rail connections 34, offset in the direction D, one for each rigid block 38. For each runner 32, the supports 62 which connect the heads 60 to the cross-members 56 are positioned between the bodies 48, in order to prevent the heads 60 from coming out of the oblong holes 50.

According to the invention, the rail 28 can be positioned in a direction of work 31 which is controlled. In addition, thanks to the invention, a technical space is provided between the rail 28 and the runners 32, for integration of additional functions necessary for the systems for management of the vacuum, supply of electricity or the like.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A guiding device comprising:
   a rail extending in a direction, and comprising a support surface configured to support and guide a tool in a direction of work parallel to the direction;
   a plurality of runners distributed in the direction, each runner being configured to occupy an active state in which the runner is immobilized, and a state of rest in which the runner can move;
   for each runner, at least one runner/rail connection connecting each runner and the rail,
   wherein each runner/rail connection is configured to allow each runner to pivot independently from the other runners relative to the rail, around an axis of pivoting parallel to the direction, and positioned on a first face of the runner configured to be placed on a work surface on which the guiding device is added in operation.

2. The guiding device according to claim 1, wherein the axis of pivoting is positioned equidistantly from the lateral edges of the runner.

3. The guiding device according to claim 2, wherein each runner/rail connection comprises a first part integral with the rail, and a second part integral with the runner, the first and second parts having forms which cooperate, configured to form a slide connection in the form of an arc of a circle with a centre positioned on the axis of pivoting.

4. The guiding device according to claim 3, wherein the second part comprises a body connected to the runner which has an oblong hole comprising an upper rim and a lower rim which are coaxial, and
   wherein the first part comprises a cross-member connected to the rail, and a head integral with the cross-member, the head comprising an upper face configured to be placed and slid on the upper rim of the oblong hole, as well as a lower face configured to be placed and slid on the lower rim of the oblong hole.

5. The guiding device according to claim 4, wherein the head is connected to the cross-member by a support, and is offset towards the axis of pivoting relative to the cross-member,
   wherein, on a first face which is oriented towards the head, the cross-member comprises at least one cylindrical cut-out coaxial with the upper face of the head,
   wherein the body comprises an upper face oriented towards the cross-member coaxial with the rim of the oblong hole, and
   wherein the distance between the upper face and the upper rim of the oblong hole is equal to the distance between the upper face of the head and the cut-out in the cross-member.

6. The guiding device according to claim 5, wherein each runner is connected to the rail by two runner/rail connections offset in the direction, the supports which connect the heads to the cross-members being positioned between the bodies of the two runner/rail connections.

* * * * *